United States Patent [19]

Miller et al.

[11] 4,216,571
[45] Aug. 12, 1980

[54] METHODS AND APPARATUS FOR INSERTING WINDING END TURN PHASE INSULATION

[75] Inventors: Sammy L. Miller, Jurong Town, Singapore; Alan L. Kindig, Holland, Mich.

[73] Assignee: General Electric Company, Fort Wayne, Ind.

[21] Appl. No.: 918,055

[22] Filed: Jun. 22, 1978

[51] Int. Cl.² .................................... H02K 15/10
[52] U.S. Cl. .................................... 29/596; 29/734; 29/736
[58] Field of Search ............ 29/596, 598, 734, 736; 310/214, 215, 260, 270, 42

[56] References Cited

U.S. PATENT DOCUMENTS

| | | | |
|---|---|---|---|
| 1,453,118 | 4/1923 | Apple | 310/214 |
| 2,701,317 | 2/1955 | Herman | 310/215 |
| 2,998,540 | 8/1961 | Phillips | 310/214 |
| 3,439,205 | 4/1969 | Houtman | 310/180 |
| 3,575,623 | 4/1971 | Stine | 310/260 |
| 3,768,152 | 10/1973 | Swanke et al. | 29/596 |
| 3,857,171 | 12/1974 | Lund | 29/596 |
| 3,872,705 | 3/1975 | Bair | 72/393 |
| 3,885,288 | 5/1975 | Lund | 29/596 X |
| 3,909,648 | 9/1975 | Clark | 310/260 |
| 4,090,290 | 5/1978 | Clark | 29/596 |

FOREIGN PATENT DOCUMENTS 1461126 1/1977 United Kingdom .

OTHER PUBLICATIONS

"Special Machines for the Production of Electric Motors"; Statomat News Bulletin 1.91.IV, 74.75; edited by Balzer & Droll.

Primary Examiner—Carl E. Hall
Attorney, Agent, or Firm—Ralph E. Krisher, Jr.

[57] ABSTRACT

Methods and apparatus are disclosed for fabricating dynamoelectric machine stator assemblies in which end turns of the different windings are separated by winding end turn insulation. In one disclosed method, a plurality of phase insulators are deformed and constrained in a substantially cylindrical configuration and moved axially into a stator core bore. The phase insulators are moved radially outward of the substantially cylindrical configuration with connectors of the insulators moving into predetermined slots of the core. In one disclosed apparatus, a substantially cylindrical arbor is provided with longitudinally extending grooves therein for positioning and accommodating connectors of the phase insulators. The phase insulators are deformed about a peripheral surface of the arbor and then retained adjacent thereto during insertion of the arbor into the bore of a core. The connectors are aligned and moved from the arbor grooves into predetermined core slots. In another aspect, an ejecting means is also disclosed for engaging and positively moving at least some of the connectors from the arbor grooves and thereby aid the stored energy, produced in the insulators by the deforming, in positioning the connectors within predetermined core slots.

25 Claims, 17 Drawing Figures

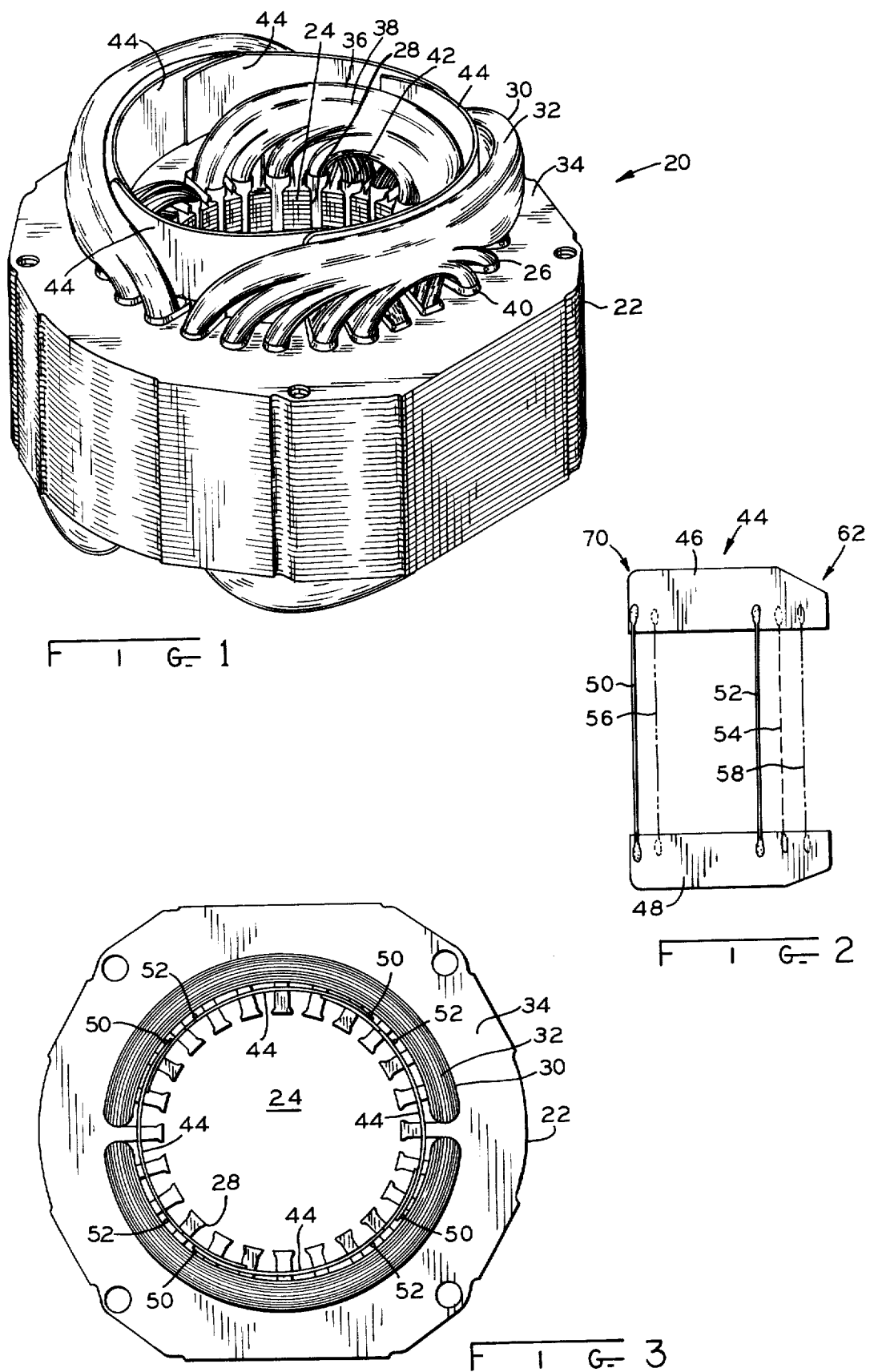

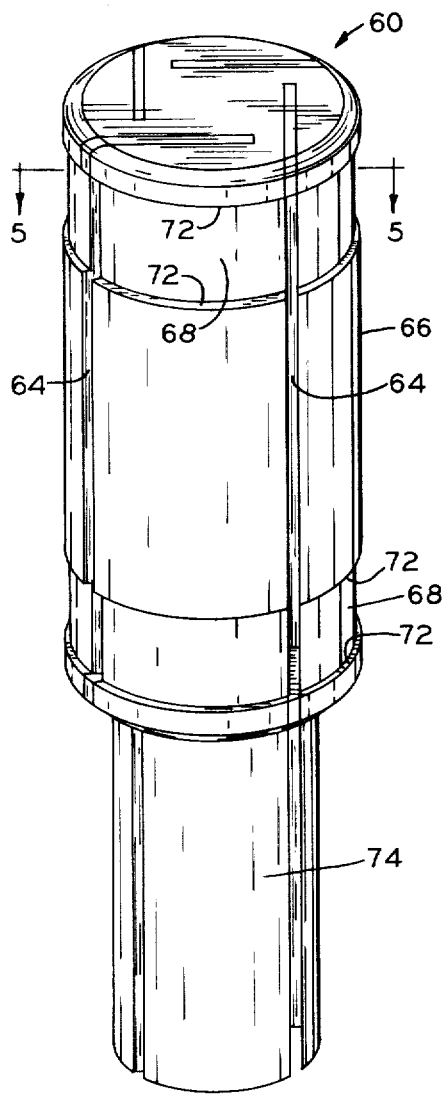
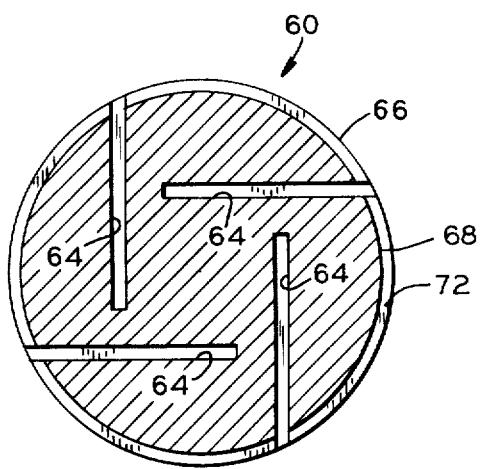
FIG. 4
FIG. 5

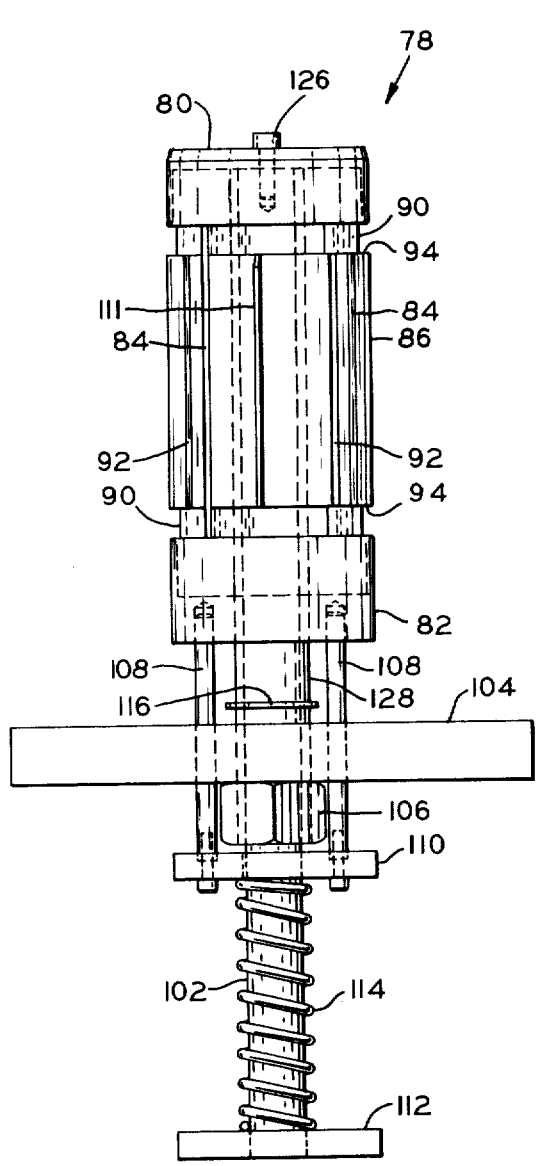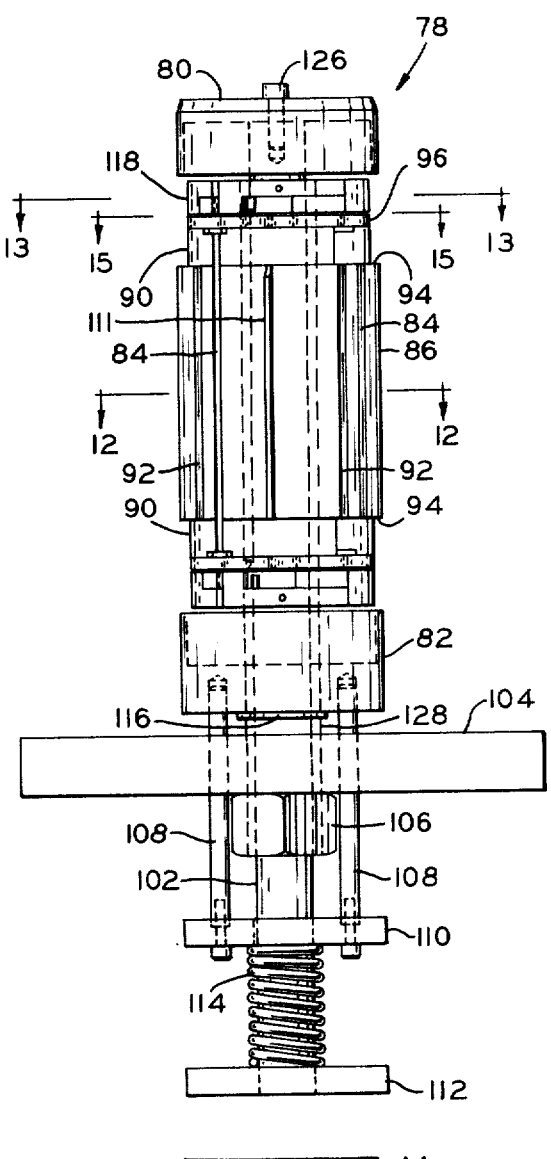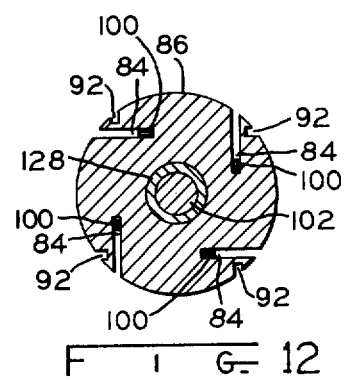

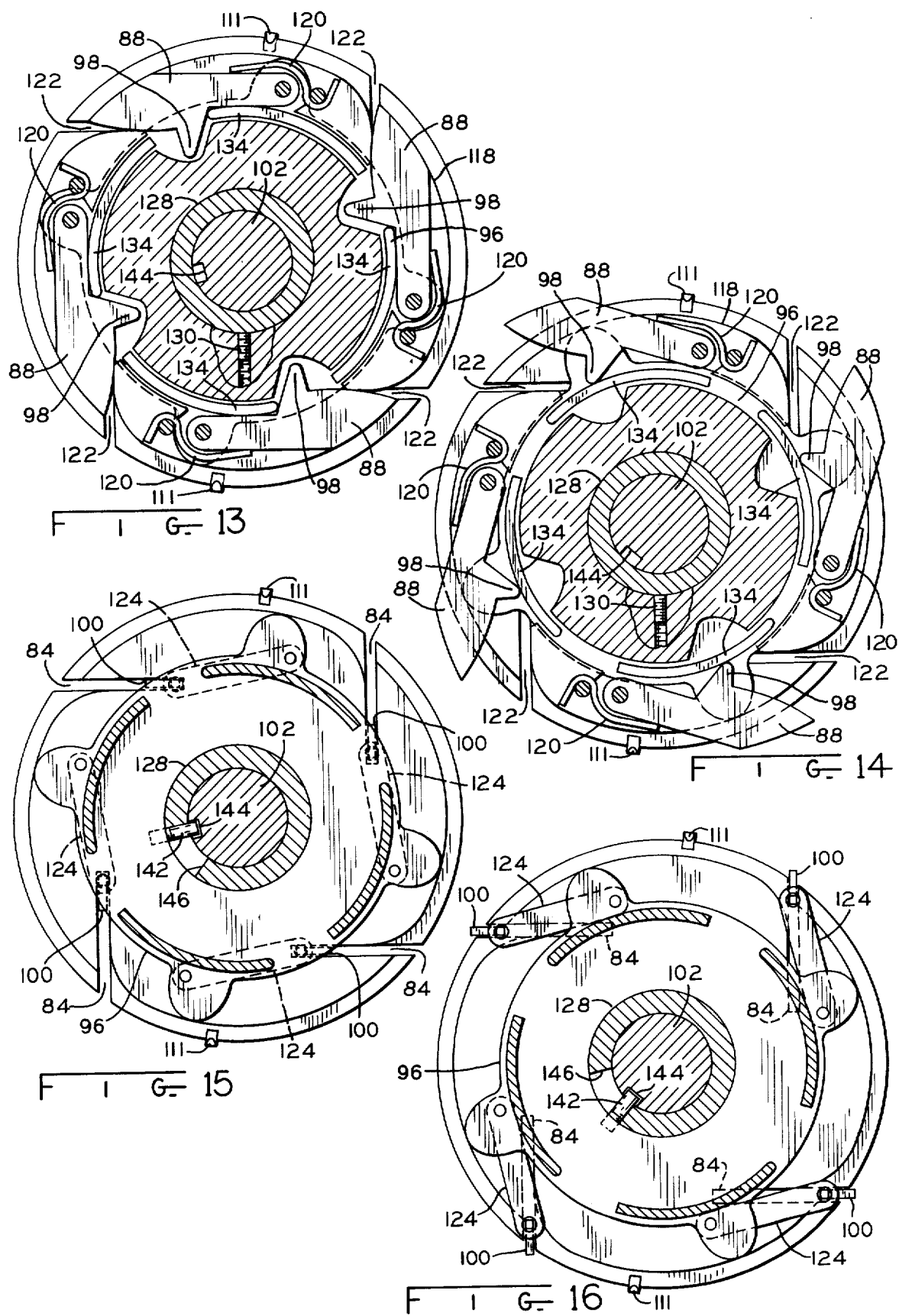

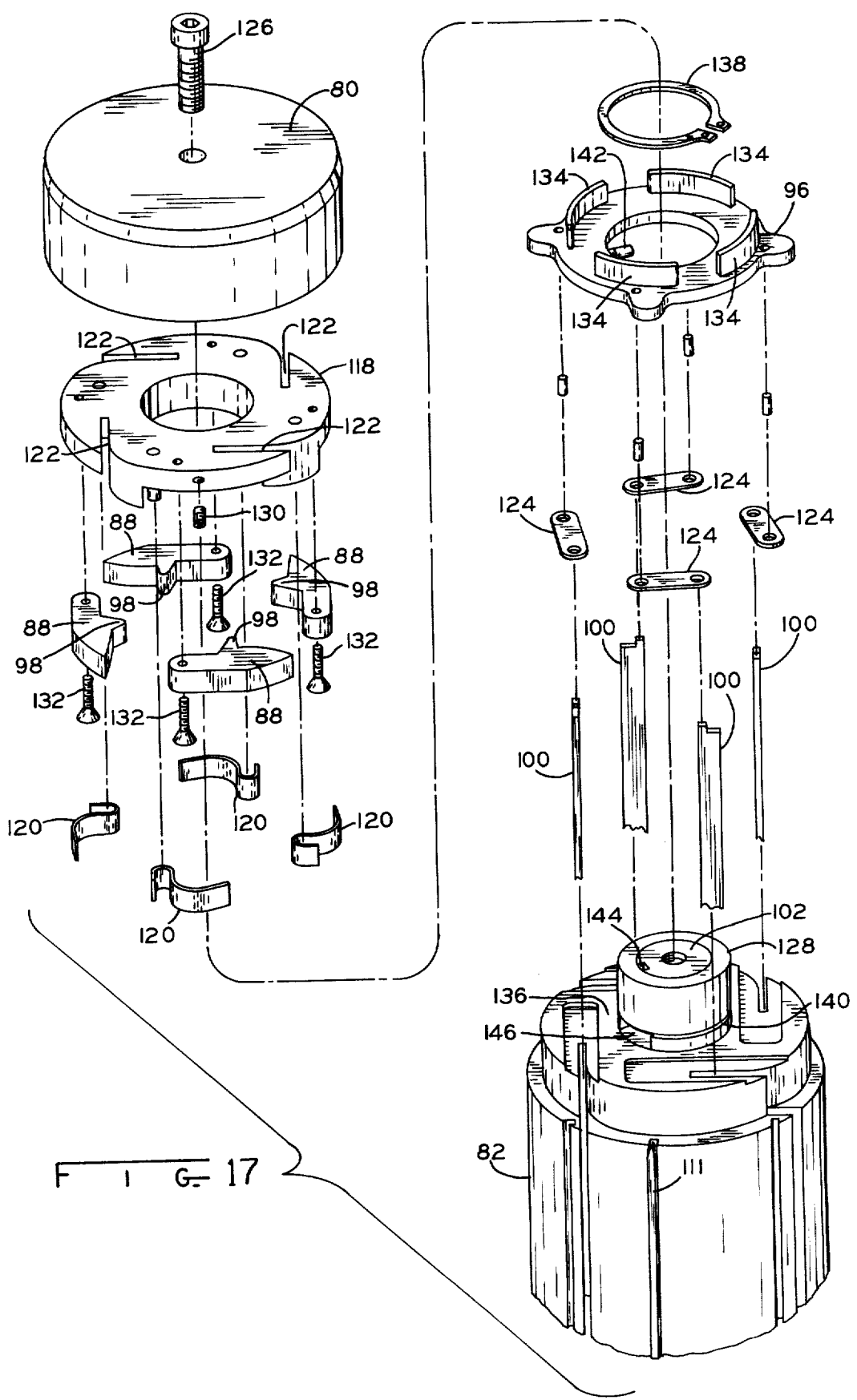

METHODS AND APPARATUS FOR INSERTING WINDING END TURN PHASE INSULATION

BACKGROUND OF THE INVENTION

The present invention relates generally to methods and apparatus for insulating between windings of a dynamo-electric machine and more specifically to methods and apparatus for inserting winding end turn phase insulation in a dynamoelectric stator assembly.

As is well known in the art, dynamoelectric machine stator assemblies may often comprise a magnetic core having a bore, axially extending slots and windings which may comprise a plurality of coils formed by multiple turns of a conductor. The multiple winding turns have side turn portions which are disposed within the axially extending slots, and end turn portions which project from the slots and which are disposed about end faces of the core. The conductors employed in forming the plurality of coils are provided with an electrical insulating coating to prevent short circuiting between the turns and each slot is electrically insulated from the core by, for example, a slot liner in order to prevent grounding of the windings to the stator core. Because winding to winding voltage potential can be appreciable, that is, more than line voltage and substantially higher when capacitors are interconnected with the windings, the conductor turns of one winding are often separated or insulated from the conductor turns of another winding by additional insulation. Without any additional insulation, a touching of the turns of one winding with the turns of another winding with such an appreciable voltage potential existence could shorten the life of the conductor insulation and/or cause insulation failure resulting in a short circuit between the windings. This additional insulation may include insulating wedges or slot separators disposed with the slots of the core to separate side turns of one winding from the side turns of another winding. The end turns of different windings may also touch each other, especially when the end turns are subjected to a blocking or pressing operation to obtain a particular end turn silhouette or configuration and thus, this additional insulation may also include end turn phase insulators disposed about the faces of the core and between end turns of the different windings.

End turn phase insulators are generally mounted or disposed on a stator core by a hand operation. When a hand insertion or manual insertion technique is employed, the phase insulators must be individually disposed or mounted, that is, one at a time on the stator core which adds considerable time and expense to the stator assembly fabrication process. Such a manual insertion operation may require three or four operators inserting end turn phase insulators in order to keep pace with automated stages of a stator assembly fabricating operation. Thus, it would be desirable to develop methods and apparatus for disposing end turn insulators on a core which would reduce the time and labor expense, and which could be employed to dispose a plurality of insulators substantially simultaneously.

Another known approach for disposing end turn phase insulation is to dispose the phase insulators essentially simultaneously with the insertion of multiple windings into the stator core. For example, the end turn phase insulators are disposed between two windings while the windings are on coil injection equipment and then subsequently inserted substantially simultaneously with the two windings. However, insertion of end turn insulators with two or more windings may create a problem of bunching together of the windings and the end turn phase insulators and thus, causing either a hangup in the insertion equipment resulting in downtime of the operation or the need for an additional operation wherein the end turns are pried apart to straighten the insulators disposed therebetween.

The difficulty in inserting end turn phase insulators simultaneously with the windings may be increased when the windings are inserted individually, i.e., utilizing multiple passes of the coil injection equipment. It is often desirable to have a maximum slot fill or maximum number of conductor turns within the slots of the core in order to maximize motor efficiency and material utilization. In obtaining maximum slot fill, it is often desirable to insert each winding individually with an intermediate distributing operation being used between insertion operations of different windings to distribute turns of a previously inserted winding within particular areas of the slots being occupied by the winding. Such individual winding insertion and intermediate distributing techniques tend to minimize forces required for winding insertion into the core and thus, eliminate problems of winding damage which may occur with elevated injection forces. However, individual winding insertion can create problems of inserting or disposing end turn insulators. The insulators can no longer be disposed between two windings for insertion, but rather must either trail the first to be inserted winding or lead the second to be inserted winding. If the end turn insulator is disposed on coil injection equipment so as to trail the first to be inserted winding, the insulator may be damaged by the stripper of the injection equipment as it strips the coils of the winding from the injection equipment to move them into selected slots of the core. On the other hand, inserting the end turn insulator with the second to be inserting winding requires that the insulator lead the second winding during the insertion process. When the insulator leads the second winding, the insulator no longer has winding turns to cushion it against surfaces of the core teeth and thus, may be damaged by sharp edges or protrusions along the surfaces.

Therefore, it would be desirable to develop end turn phase insulator inserting techniques which would minimize the disposing time and labor involved over the individualized hand insertion techniques and techniques which would minimize end turn disposing problems incurred when windings are individually inserted into a core. It would also be desirable to develop end turn phase insulator disposing techniques which would be independent of the winding insertion operations and thus, alleviating any problems of coil injection equipment downtime and the scrapping of winding materials resulting from injection equipment hang-ups.

Accordingly, one of the general objects of the present invention is to develop new and improved methods and apparatus for inserting end turn phase insulators into a dynamoelectric machine stator core.

A more specific object of the present invention is to develop methods and apparatus for simultaneously inserting a plurality of end turn insulators into a stator core.

Another object of the present invention is to develop new and improved methods of inserting phase insulators while minimizing the time and expense of the inserting operation.

Still another object of the present invention is to develop new and improved methods of inserting end turn phase insulators which are independent of coil injection operations and which can be employed in stator assembly fabrication processes requiring individualized insertion of windings.

Yet another object is to develop new and improved methods and apparatus for manipulating, aligning and disposing end turn phase insulators on a stator core.

Yet still another object is to develop new and improved methods utilizing end turn phase insulator characteristics to dispose the end turn insulators on a stator core.

SUMMARY OF THE INVENTION

Methods and apparatus are disclosed for fabricating dynamoelectric stator assemblies in which the windings thereof are separated from each other by end turn phase insulators disposed about at least one face of a stator core with connectors or connecting portions, disposed within some of the slots of the stator core, being employed to retain the insulators in position during the stator assembly fabrication process.

One method that exemplifies the invention in one preferred form involves deforming a plurality of phase insulators so as to constrain the insulators to lie within an imaginary cylinder having a diameter less than the diameter of a bore of a core on which the phase insulators are to be disposed. The one preferred method further involves axially moving the phase insulators while constrained into the bore of the core and aligning the connectors with predetermined slots of the core. The one preferred method still further involves moving the phase insulators radially outward beyond the imaginary cylinder and moving the connectors of the phase insulators into the predetermined slots of the core.

Another method that exemplifies the invention in another preferred form involves placing at lease one connector of a leading end of at least one phase insulator at a first predetermined location on an inserting device and deforming the at least one phase insulator about a peripheral surface of the device. The another method further includes placing at least one other connector of the phase insulator at a second predetermined location on the inserting device which is spaced apart from the first predetermined location, and retaining at least part of the end portion of the phase insulator adjacent to the peripheral surface. The another method still further involves aligning and moving the core and inserting device relative to each other so as to dispose the inserting device within the bore, releasing the at least part of the end portions and moving the at least one other connector into a predetermined slot of the core, and aligning and moving the at least one other connector into another predetermined slot of the core.

An apparatus which exemplifies the invention in still another preferred form and which may be used to carry out the above-described methods includes a means for deforming at least part of at least one insulating end portion of at least one phase insulator in a generally arcuate configuration and a means for positioning and accommodating at least two connectors of the at least one phase insulator at predetermined spaced-apart locations on the deforming means. The apparatus further includes a means for constraining the at least part of the insulating end portion on the deforming means while the end portion is deformd in the generally arcuate configuration. The deforming means is movable within the bore of a core with the phase insulator constrained thereon and release of the means for constraining while the deforming means is disposed within the bore allows movement of the at least two connectors into predetermined slots of the core.

Another apparatus which exemplifies the invention in yet another preferred form includes an arbor capable of insertion into the bore of a core and having a deforming surface thereon for deforming at least part of insulating portions of at least one phase insulator. The arbor is provided with a leading end accommodating means which may be, for example, a groove or recess for accepting at least one connector of a leading end of the phase insulator. The arbor further includes a trailing end accommodating means which may also be, for example, a groove or recess for accepting at least one other connector of a trailing end of the phase insulator. A means is provided for limiting radial movement of the insulating portions of the phase insulator away from the deforming surface of the arbor and thus, allow the arbor and core to be moved relative each other to move the arbor into an insulator insertion position within the bore.

In another aspect of the invention, energy is stored in a plurality of phase insulators by, for example, deforming the insulators in a predetermined configuration. This stored energy is utilized to position the insulators on a core by releasing the stored energy after the insulators have been moved axially into a bore of the core. The release of the stored energy causes connectors of the phase insulators to move from the bore into predetermined slots of the core.

In still another aspect of the invention, an ejecting means which may be, for example, a camming mechanism is provided to engage portions of at least one end of a phase insulator and positively move the at least one end for disposing the at least one end at a predetermined position on the core.

BRIEF DESCRIPTION OF THE DRAWINGS

Other objects of the present invention and their attendant advantages, will become readily apparent from the following description taken in conjunction with the accompanying figures in which like reference numbers are used to describe like parts throughout the several views, wherein:

FIG. 1 is a perspective view of a stator assembly illustrating disposition of phase insulators of the assembly relative the assembly core and end turns of windings;

FIG. 2 is a plan view of one of the phase insulators of FIG. 1, illustrating details thereof and also illustrating possible alternate locations for connectors of the phase insulator relative to end turn insulating portions;

FIG. 3 is an end view of the stator assembly of FIG. 1 when partially completed, illustrating disposition of the phase insulators of the type illustrated in FIG. 2 adjacent to end turns of a main winding before an auxiliary winding is disposed on the core;

FIG. 4 is a perspective view of a phase insulator inserting device for disposing phase insulators of the type illustrated in FIG. 2 on the core;

FIG. 5 is a cross-sectional view of the phase insulator inserting device of FIG. 4 illustrating grooves therein for accommodating leading and trailing ends of the phase insulators.

FIG. 10 is a perspective view of another phase insulator inserting device for disposing phase insulators of the type illustrated in FIG. 2 on the core;

FIG. 11 is a perspective view of the phase insulating inserting device of FIG. 10 illustrating retaining caps thereof in an open position for loading the phase insulators thereon;

FIG. 12 is a cross-sectional view of the phase insulating inserting device of FIG. 11, illustrating different configured grooves therein for accommodating portions of the phase insulators;

FIGS. 13 and 14 are cross-sectional views of the phase insulator inserting device of FIG. 11, illustrating operation of cam operated spring arms for retaining and ejecting end turn insulating portions of the phase insulators;

FIGS. 15 and 16 are cross-sectional views of the phase insulator inserting device of FIG. 11, illustrating operation of cam operated ejecting blades for ejecting connectors of leading ends of the phase insulators from the accommodating grooves; and FIG. 17 is an offset perspective view of one end of the phase insulator inserting device of FIG. 11 with components thereof unassembled, illustrating assembly details of the device.

DESCRIPTION OF THE PREFERRED EMBODIMENTS

Figure 6:
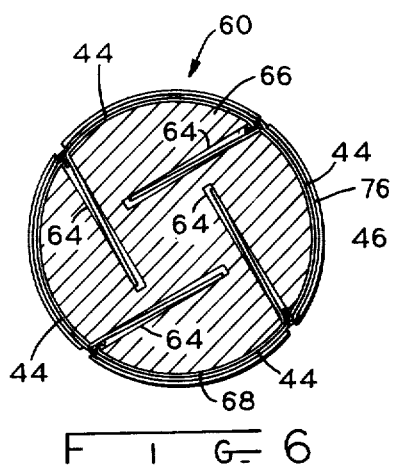
FIG. 6 is an end view of the phase insulator inserting device of FIG. 4 with four phase insulators of the type illustrated in FIG. 2 disposed and retained thereon.

One preferred form of the invention may be practiced when fabricating dynamoelectric stator assemblies such as stator assembly 20 illustrated in FIG. 1. As illustrated, the stator assembly includes a magnetic core 22, which may be formed from a plurality of laminations or other suitable means, having a longitudinally extending bore 24 and a plurality of longitudinally or axially extending slots 26 disposed radially around the bore and having openings 28 into the bore. The stator assembly further includes a main winding 30 having side turns disappearing within selected slots of the core and end turns 32 disposed about two faces 34 (only one being shown) of the core. An auxiliary winding 36 is also provided with side turns disappearing within selected slots of the core and end turns 38 disposed about the faces of the core.

Insulating slot liners 40 are disposed in the slots to insulate side turns of the main and start windings from the core and insulating slot wedges 42 are provided at the slot openings 28 to separate the auxiliary winding side turns from the bore of the core. Not shown insulating slot separators or wedges are provided to separate the side turns of the main and auxiliary windings from each other and are disposed within the slots between the side turns of the two windings.

Phase insulators such as 44 provide additional electrical insulation between the end turns 32 of the main winding 30 and the end turns 38 of the auxiliary winding 36. Even though conductors employed to fabricate windings are insulated, additional insulation is often preferred between the end turns of the different windings since a substantial voltage potential between the windings may result during stator assembly operation. Such substantial voltage potential difference between the windings may cause a breakdown of the insulation on the conductors causing a short between windings and/or shorten the life of the stator assembly. Insulation between end turns of different windings is especially desirable where stator assembly applications require end turns of its windings to have a particular silhouette or configuration about one or both faces of the core since compressing or shaping of the end turns to attain such a silhouette increases the likelihood of touching between turns of different windings.

FIG. 2 illustrates one of the phase insulators 44. The phase insulator comprises two end turn insulators or end turn insulating portions 46 and 48 secured or interconnected to each other by two connectors 50 and 52 with such interconnection being accomplished by, for example, ultrasonically welding the connectors and the end turn insulating portions. The end turn insulating portions are fabricated from a flexible insulating material such as, for example, the material marketed under the trakemark "MYLAR" by the E. I. DuPont de Nemours and Company. The connectors are fabricated from any suitable non-conductive material such as, for example, a polyester monofilament material marketed as "Travira" Grade T-960 by Hoechst Fibers Ind. which is a division of Americal Hoechst Corporation with an office at 1515 Broadway, Astor Plaza, New York. N.Y. The end turn insulating portions 46 and 48 may be the same or one end turn insulator may differ from the other insulator such as by being greater or less in width as depicted in FIG. 2 in order to provide adequate separation between end turns of the different windings. The particular configuration of each end turn insulator will be determined by factors such as, for example, the silhouette of the winding end turns at each winding face. In fact, some stator assembly applications may require a particular winding end turn silhouette at only one face of the core and thus, it may be desirable to provide only one end turn insulator.

FIG. 2 also illustrates varying locations of the connectors 50 and 52 relative to each other. The connectors which are disposed within slots of the core, retain the end turn insulators in position about the core faces during subsequent processing operations of the stator assembly. The spacing between the connectors may be varied, for example, to dispose a particular connector in a different slot of the core. For example, the connector 52 could be moved to the position as illustrated by the dotted line 54 and thereby cause subsequent disposition of the connector in a different slot of the core as will be discussed hereinbelow. Still further, both connectors may be disposed substantially symmetrically about the end turn insulating portions such as, for example, illustrated by broken lines 56 and 58. The number of connectors may also be varied as needed to provide adequate end turn insulator retention about the core faces. The number and position of the connectors may be varied as necessary for obtaining sufficient end turn insulator retention during subsequent process operations.

In fabricating the stator assembly 20, the main and auxiliary windings, 30 and 36, respectively, comprising multiple turns of insulated conductors, often referred to as magnet wire, are developed employing known winding techniques and winding machines such as, for example, those disclosed in Mason U.S. Pat. No. 2,934,099 which issued Apr. 26, 1960 or Lauer et al U.S. Pat. No. 3,977,444 which issued Aug. 31, 1976, the entire disclosures of which are incorporated herein by reference. After the main winding has been developed, the winding turns are inserted into axially extending slots of a magnetic core using conventional injection techniques such as, for example, those disclosed in Hill U.S. Pat. No. 3,324,536 which issued June 13, 1967 or Smith U.S. Pat. No. 3,698,063 which issued Oct. 17, 1972, the entire disclosures of which are incorporated herein by reference.

After the main winding has been developed and disposed in the selected slots of the core, the phase insulators 44, shown more clearly in FIG. 2, are disposed on the core so that the end turn insulating end portions 46 and 48 are positioned adjacent the inner periphery of the main winding end turns 32 as illustrated in FIG. 3. The end turn insulators are retained in position about the core face 34 by the connectors 50 and 52 which are disposed within predetermined core slots as illustrated and which extend through the slots to retain oppositely disposed end turn insulators in position on the other face of the core.

After the end turn insulators have been disposed on the core 22 as illustrateed in FIG. 3, the auxiliary winding 36 (FIG. 1) is then inserted into selected slots of the core using conventional injection techniques such as discussed hereinabove. The auxiliary winding is inserted radially inwardly of the end turn insulator portions 46 and 48 relative to bore 24 and thus, the end turns 38 of the auxiliary winding, after insertion, are separated from the end turns 32 of the main winding as illustrated in FIG. 1. If a stator assembly with more than two windings were to be fabricated and end turn insulators were desired between end turns of each of the different windings, more than one phase insulator insertion operation would be required. For example, if a three phase motor were being fabricated, two sets of phase insulators would be required with one set being disposed on a core after the first phase winding was inserted to separate end turns of the first and second phase windings and with another set being disposed on the core after the second winding was inserted to separate end turns of the second and third phase windings.

In carrying out the invention in one form, a plurality of the phase insulators 44 are deformed so as to be constrained to lie within an imaginary cylinder having a diameter less than the bore of the core. While confined within the imaginary cylinder, the insulators are moved axially into the bore. The connectors 50 and 52 of the insulators are aligned with predetermined slots of the core and moved radially outward from the imaginary cylinder and into the predetermined slots.

The phase insulators may be disposed on the core by a phase insulating means or device such as inserting device 60 illustrated in FIGS. 4 and 5. Referring to FIGS. 2, 4 and 5, the phase insulators are loaded onto the inserting device by positioning leading ends, designated generally as 62, of the insulators including the connectors 52 at predetermined locations on arbor 66 and in a leading end accommodating or receiving means illustrated as four longitudinally extending grooves or recesses 64 within arbor 66. The phase insulators are then deformed in a substantially arcuate configuration about a deforming means illustrated as deforming or outer surfaces 68 and thus, the insulators are deformed to establish a substantially cylindrical configuration. The connector 50 of trailing ends, designated generally as 70, are positioned at second predetermined locations in trailing end accommodating or receiving means, which in the illustrated device, are the slots or grooves 64. With the illustrated device, the leading end of a phase insulator is disposed in one of the slots or grooves and the connector 50 of the trailing end is disposed in one of the adjacent slots or grooves. Although the insulators are hand placed or disposed on the inserting devices illustrated herein, the insulators may also be loaded with a mechanical means designed for that purpose. Longitudinal displacement of the phase insulators along the arbor is prevented or limited by a longitudinal displacement means illustrated as abutments 72 adjacent to the deforming surfaces 68. The inserting device is provided with a handle 74 integral with the arbor to aid manipulation of the device within the bore of the core.

FIG. 6 illustrates the inserting device 60 with four of the phase insulators 44 disposed and retained thereon. Radial outward movement of the phase insulators is prevented by a retaining means illustrated as two rubber bands 76 (only one of which is visible from FIG. 6) disposed about the arbor 66 to retain at least a part of the two insulating end portions 46 and 48 of each insulator adjacent to the deforming or peripheral surfaces 68 of the arbor. Of course, any suitable retaining means may be used such as for example a vacuum system.

Figure 7:
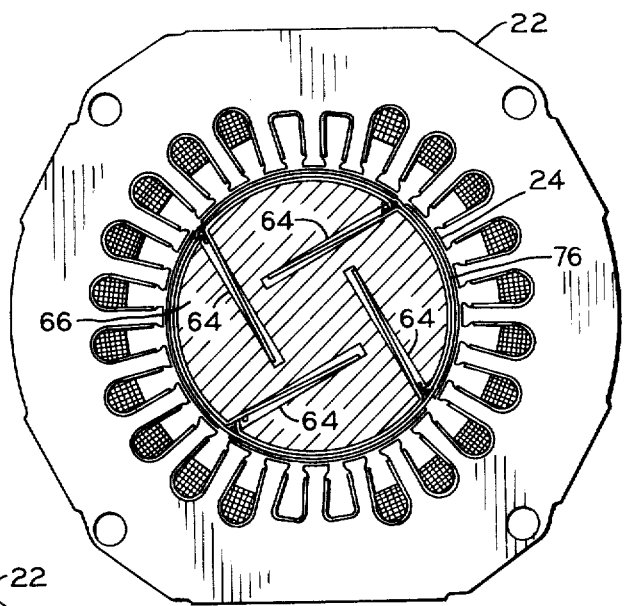
FIGS. 7-9 are end views of the core with the main winding therein and the phase insulator inserting device with phase insulators thereon, illustrating disposition of the device and movement of the phase insulators onto the core.
Figure 8:
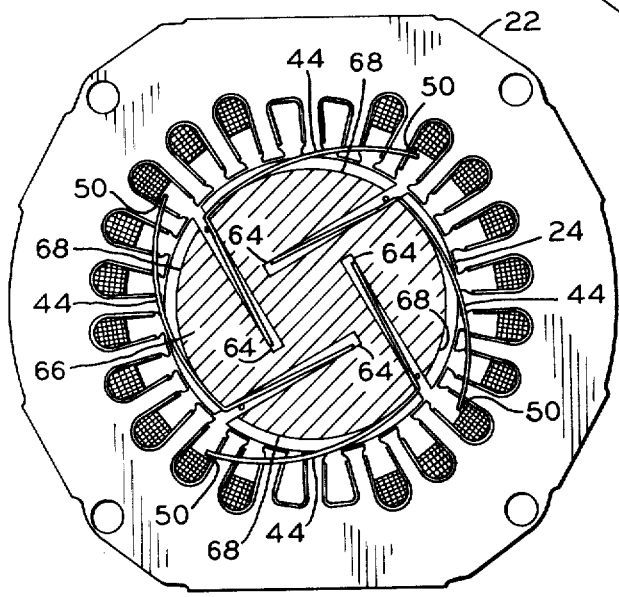
Figure 9:
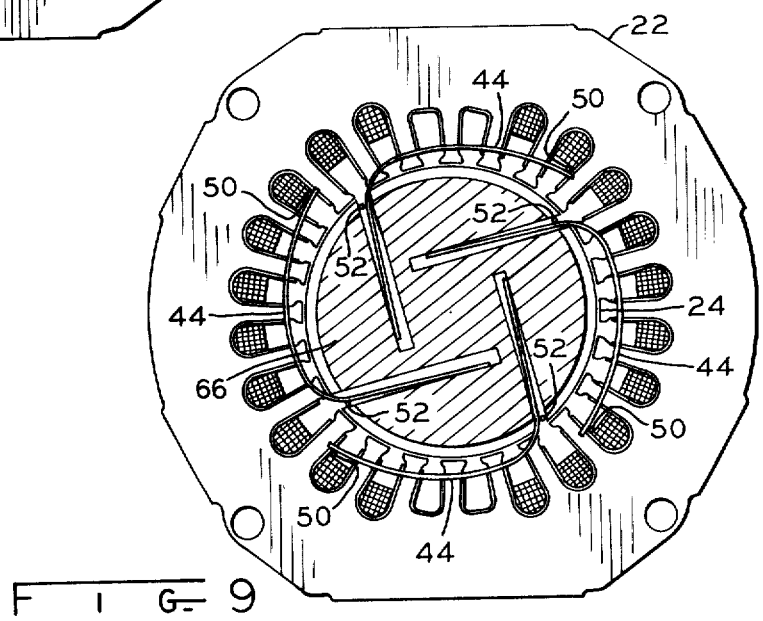

After the phase insulators have been disposed on the inserting device and are retained thereon, the inserting device and core 22 are aligned and moved relative to each other so as to dispose the arbor 66 within the bore 24 of the core as illustrated in FIG. 7. The bands or retainers 76 holding the phase insulators adjacent to the periphery surface of the arbor are then released causing the connector 50 of the trailing end of each insulator to move outwardly from the grooves 66 of the arbor into predetermined slots of the core as illustrated in FIG. 8. The inserting device is then rotated clockwise, for example 15° to a position such as illustrated in FIG. 9 so as to align the connectors 52 of the leading ends of the phase insulators with other predetermined slots of the core. The leading ends of the phase insulators, including the connectors 52, are then moved outwardly from their respective grooves and into the other predetermined slots of the core. The inserting device is then removed from the bore of the core in order to allow subsequent insertion of the auxiliary winding 36 (FIG. 1).

With the disposing or inserting approach discussed hereinabove utilizing the phase insulator 44 illustrated in FIG. 2, the connectors of the insulators will be disposed in different slots of the core as can be seen in FIG. 9. However, connectors of adjacent insulators could be disposed in the same slot, if desired. As mentioned previously, the location of the connectors of the phase insulator can be varied. For example, the connector 52 could be moved to the position indicated by the dotted line 54 in FIG. 2 so that the span between the two connectors of each insulator would be 90 degrees when disposed on the core. By relocating this connector on each of the phase insulators, the connectors 52 of the leading ends of the insulators could be disposed within slots of the core substantially simultaneously with the connectors 50 of the trailing ends of the insulators with connectors of each insulator sharing slots with connectors of adjacently disposed insulators. Thus, the repositioning or relocating of connector 52 would eliminate the necessity of rotating the arbor to the position illustrated in FIG. 9 in order to dispose the connector 52 of each insulator in the proper slots of the core. The additional rotation of the arbor could also be eliminated by moving both connectors to the positions indicated by the broken lines 56 and 58 of FIG. 2 with a sufficient distance being provided between the connectors to span six slots of the core of FIGS. 7-9 rather than five and thus allow the connections to share slots and to be disposed substantially simultaneously.

In the hereinabove described inserting process, energy is stored in each phase insulator by its deformation. Removal of the bands 76 (FIG. 6) after the arbor 66 is within the bore of the core releases this stored energy and is utilized to move the connectors away from the arbor and into the predetermined slots as illustrated in FIGS. 7-9. However, to assure positive positioning of the last to be disposed insulator end, that is, the leading end 62 of the insulator, an ejecting means could be provided to engage the leading ends and positively move them from their respective grooves. For example, a drill could be provided in the arbor with each of the grooves 64 opening into the drill. A means for ejecting, e.g., cam operated blades could be provided in each groove to push the leading end of the end turn insulator from the grooves. Such blades could be operated or cammed outwardly by a cam device such as, for example, cam 51 illustrated in commonly assigned Bair U.S. Pat. No. 3,872,705 which issued Mar. 25, 1975, the entire disclosure of which is incorporated herein by reference. One or more garter springs could be disposed about the arbor to engage and retract the blades after they have been moved through the grooves to eject the leading ends of the phase insulators.

Another way of accomplishing substantially simultaneous disposal of the leading and trailing ends of the phase insulators 44 and a way which would not require modification of the phase insulator would be to provide additional grooves or slots on the arbor 66 of FIG. 4. With four insulators being disposed, four additional grooves could be provided to position and accommodate the connector 50 of the trailing end of the insulator. The grooves would be located on the arbor so that the connectors 52 of the phase insulators would be aligned at the same time as the connectors 50 with the respective slots of the core into which they are to be disposed. Thus, the additional rotation of the arbor to the position as illustrated in FIG. 9 would not be required.

As can be seen in FIG. 3, the insulating end portions of the phase insulators 44 overlap each other after being disposed about the face of the core and form a pinwheel configuration of insulators about the face. This overlapping of the insulator end portions assures good electrical insulation between end turns of the main and auxiliary windings. The overlapping configuration is termed a pinwheel configuration because, as can be seen in FIG. 3, each phase insulator 44 has one end of its insulating portion disposed radially outwardly relative to the bore 24 of one adjacent phase insulator and the other end of its insulating portion disposed radially inwardly relative to the bore of an end of the other adjacent phase insulator. This pinwheel configuration of phase insulators is characteristic of stator assemblies fabricated by processes described herein.

After the phase insulators have been disposed within the core, the auxiliary winding 36 also comprising multiple turns of an insulated conductor developed by known techniques discussed hereinabove, is inserted into predetermined slots of the core by known techniques also discussed hereinabove. The end turns 38 of the auxiliary winding and the end turns 32 of the main winding 30 are thus separated as illustrated in FIG. 1 by the previously disposed or inserted phase insulators 44 and thus, provide additional insulation to eliminate the problems inherent in a voltage potential between the windings.

Another inserting means or device for disposing phase insulators such as phase insulator 44 (FIG. 2) on the stator core is illustrated perspectively in FIGS. 10 and 11 with details thereof illustrated in FIGS. 12-17. For brevity, only a portion of a camming arrangement of inserting mechanism 78 is illustrated in FIGS. 13-17 and described hereinbelow, i.e., the portion located near the top of the device as viewed in FIGS. 10 and 11. However, it is to be noted that the remaining portion of the camming mechanism comprises elements which are identical in configuration and operation as the elements illustrated in FIGS. 13-17 and described hereinbelow, and are located near the bottom of the inserting device as viewed in FIGS. 10 and 11. Further, the identical elements are mounted in a "mirror image" relationship to the hereindescribed and illustrated elements and are operated simultaneously with such elements.

Referring to FIGS. 2, and 10-16 in general, the phase insulators 44 are loaded onto inserting device or mechanism 78 with the two retaining caps 80 and 82 in an extended position as illustrated in FIG. 11. The leading ends 62 of four of the phase insulators including connectors 52 are disposed at predetermined locations within a leading end accommodating means illustrated as four longitudinally extending slots or grooves 84 (see FIG. 12) within substantially cylindrical arbor or cage 86. The leading ends are retained in the predetermined locations or grooves by spring loaded retaining arms 88 (FIG. 13). Parts of the end turn insulating portions 46 and 48 are then deformed in an arcuate manner about deforming or peripheral surfaces 90 and the connectors 50 of the trailing ends 70 of the phase insulators are positioned at other predetermined locations on the device by moving the connectors into a trailing end accommodating means illustrated as four additional longitudinally extending slots or grooves 92. Parts of the end turn insulating portins are retained adjacent to the deforming surfaces and thereby, prevented from moving radially outward by retracting the retaining caps 80 and 82 to the position shown in FIG. 10. The parts of the end turn insulating portion adjacent to the deforming surfaces are thus, trapped or retained between the deforming surfaces and the caps. Longitudinal displacement of the phase insulators is also prevented by a longitudinal displacement means illustrated as abutments 94.

After the phase insulators have been loaded and are retained on the inserting mechanism 78, the core 22 (FIG. 1) and the mechanism or device are aligned and moved relative to each other to dispose the deformed insulators within the bore 24 of the core. The parts of the end portions of the insulators adjacent the deforming surfaces 90 are then released by extending or opening the retaining caps 80 and 82 to the position shown in FIG. 11. Upon such release, the connectors 50 of trailing ends 70 of the phase insulators (FIG. 2) are moved or spring outwardly from the grooves 92 and into predetermined slots of the core. The leading ends 62 are moved or ejected outwardly from their respective slots or grooves 84 by rotating a cam plate 96 from the position shown in FIGS. 13 and 15 to the position shown in FIGS. 14 and 16. Rotation of the cam plate releases the retaining arms 88 and causes ejecting portions 98 of each arm to engage and push the end turn insulating portions from the grooves 84. Rotation of the cam also causes an ejecting means illustrated as blades 100 (FIGS. 15 and 16) to engage and push the connectors 52 from the grooves 92 and into other predetermined slots of the core. Thus, the phase insulators are disposed on the core 22 in a pinwheel configuration as illustrated in FIG. 3. The auxiliary windings 36 are then disposed on the core utilizing conventional injection techniques discussed hereinabove to produce the stator assembly 20 as shown in FIG. 1.

As mentioned previously, the locations of the connectors 50 and 52 of the phase insulator 44 may be varied from the locations illustrated in FIG. 2. If the connectors were spaced further apart, for example, by moving connector 52 to the position indicated by dotted line 54, the phase insulators could be loaded onto the inserting mechanism or device of FIG. 11 by utilizing only the four grooves 84 and thus, eliminating the need for the other four grooves 92.

Referring to FIGS. 10–12, the inserting mechanism 78, illustrated perspectively in FIGS. 10 and 11, includes two substantially identical retaining cap members 80 and 82 disposed at opposite ends of the arbor or cage 86. The retaining caps are movable relative to each other and relative to the cage. The cap member 80 is attached to a shaft 102 which is slideably mounted within the cage, the oppositely disposed end cap 82, the mounting plate 104 and nut 106. Bolts 108, which are movable within the mounting plate 104 interconnect the retaining cap 82 with a retracting plate 110 which is slideably mounted about the shaft 102. The cage is provided with the four grooves or recesses 84 extending longitudinally along the cage for positioning and retaining the leading ends of phase insulators. The cage is also provided with the four differently configured grooves or recesses 92 for positioning and accommodating the connectors of the trailing end of the phase insulators. Further, the cage is also provided with keys or seams 111 to facilitate alignment of the cage and core so that the cage is oriented relative to the core in a predetermined insertion position within the bore.

In order to load the phase insulators onto the cage of the inserting mechanism, the retaining caps 80 and 82 are retracted from the position shown in FIG. 10 to the position illustrated in FIG. 11. The retaining cap 80 is retracted, i.e., moved upwardly from the position shown in FIG. 10 by moving plate 112 which is attached to the shaft 102. The retaining cap 82 is retracted from the position shown in FIG. 10 by moving the retracting plate 110 downwardly along the shaft 102, thereby compressing the spring 114 as illustrated in FIG. 11 and pulling the end cap away from the cage. Stop 116 mounted on the collar 128 limits the downward or retracting movement of the retaining cap 82. The spring 114 disposed about the shaft provides a means for returning the retaining cap 82 back to a retaining position after the phase insulators have been loaded onto the arbor. The upperly disposed cap or retaining cap 80 is returned to a retaining position by moving the shaft 102 downwardly to the position shown in FIG. 10.

FIGS. 13–16 illustrate details of a portion of a camming mechanism which provides a means for retaining the leading ends of the phase insulators within the grooves 84 of the cage 86 and for ejecting the leading ends of the phase insulators including connectors thereof out of their respective grooves into predetermined slots of the stator core. FIGS. 13 and 14 illustrate a means for retaining the leading ends of the phase insulators. As illustrated, the four pivotally mounted retaining arms 88 are disposed about the periphery of a slotted plate 118. A spring member 120 is provided for each retaining arm so as to cause the retaining arm to compress against and thereby retain the end portion of each leading end of a phase insulator after it has been inserted into the grooves and thereby facilitates the deformation of the end portion about the deforming surfaces of the cage. The cam plate 96, movable with the rotation of shaft 102, engages and pivots each of the retaining arms to release the phase insulators and substantially simultaneously cause ejecting portion 98 of the arms to engage and move the end portions of the phase insulators outwardly through the grooves 84 (FIG. 12) of the cage and grooves 122 of the slotted plate and into the predetermined slots of the core.

FIGS. 15 and 16 illustrate a means for ejecting the connectors of the leading ends of the phase insulator out of the grooves 84 and into the predetermined slots of the core. As illustrated, a blade is provided within each of the grooves 84 which accommodate the connectors of the leading ends of the phase insulators. The blades 100 are attached to the cam plate 96 by way of connecting arms 124 so that movement of the cam plate causes the blades to move outwardly through the grooves and push the connectors of the phase insulators out of the grooves of the cage and into the predetermined slots of the core.

FIG. 17 illustrates assembly details of the retaining cap 80 and a portion of the camming mechanism. As mentioned previously, an identical portion of the camming mechanism arrangement is located on the opposite end of the cage 86 in the same mounting relationship to retaining cap 82 (FIG. 11). As illustrated, the retaining cap 80 is secured by bolt 126 to shaft 102 which extends through components of the camming mechanism. Slotted plate 118 is positioned over collar 128 and held thereto by set screw 130. The slotted plate also has the four retaining arms 88 secured thereto by four bolts 132 with the spring member 120 mounted about each arm. The cam plate 96, which is provided with four cam shoulders 134, is mounted adjacent to the top surface 136 of the cage and is held in position by spring 138 mounted in recess 140. Screw 142 attached to the cam plate allows upward movement of the shaft 102 within recess 144 while limiting lateral movement of the cam plate by being disposed within slot 146. The four connecting arms 124 interconnect the cam plate and blades 100.

Although the present invention has been described in terms of specific embodiments, it will be apparent that numerous modifications can be made without departing from the invention. Therefore, it is intended by the appended claims to cover all such modifications which fall within the true spirit and scope of the invention.

I claim:

1. A method of fabricating a dynamoelectric machine stator assembly including a core having faces, having a longitudinally extending bore, and having a plurality of longitudinally extending slots opening into the bore; including a plurality of windings having side turns disposed within the slots, and having end turns disposed about the faces of the core; and including at least one phase insulator having oppositely disposed end turn insulators disposed between end turns of at least two windings and having connectors disposed within some of the slots for securing together the oppositely disposed end turn insulators; said method comprising: disposing at least one winding on the core so that side turns thereof reside within selected slots of the core and so that end turns thereof are disposed about the faces of the core; disposing at least one phase insulator on an inserting device so that at least two connectors thereof are accommodated thereon and so that at least part of the end turn insulators are disposed about the inserting device; retaining the end turn insulators on the inserting device; aligning and moving the core and inserting device relative to each other so that the inserting device is within the bore of the core; releasing the end turn insulators and moving at least one connector into a slot of the core; moving at least one remaining connector of the at least one phase insulator from the inserting device into another slot; moving the core and inserting device relative to each other so as to remove the inserting device from the bore of the core; and disposing at least one other winding on the core so that side turns thereof reside within slots of the core and so that end turns thereof are disposed about the faces of the core and so that at least part of the end turns thereof are separated from at least part of the end turns of the at least one winding by the end turn insulators of the at least one insulator.

2. The method of claim 1 wherein the inserting device includes a plurality of grooves therein and wherein the disposing of the at least one phase insulator on an inserting device includes moving connectors thereof within grooves of the inserting device.

3. The method of claim 2 wherein the releasing of the end turn insulators causes at least one connector to move from its respective groove into a slot of the core.

4. The method of claim 1 wherein the moving of the at least one remaining connector includes camming the at least one remaining connector away from the inserting device so that the at least one remaining connector moves from the inserting device into another slot of the core.

5. A method of inserting phase insulators, for use in fabricating a dynamoelectric machine stator assembly; wherein the stator assembly includes a core having faces, having a longitudinally extending bore, and having a plurality of longitudinally extending slots disposed radially around and opening into the bore, and wherein the stator assembly further includes a plurality of windings having side turns disposed within the slots and end turns disposed about the faces of the core, and also includes at least one phase insulator that comprises oppositely disposed insulating portions disposed between the end turns of at least two windings and that also comprises connectors disposed within some of the slots for securing together the oppositely disposed insulating portions; said method comprising: positioning at least one connector of the at least one phase insulator at a first predetermined location on an inserting device; deforming and disposing at least part of at least one of the insulating portions of the phase insulator about the inserting device, and positioning at least one other connector at a second predetermined location on the inserting device; retaining the at least part of at least one of the insulating portions about the inserting device; aligning and moving the inserting device and core relative to each other for disposing the inserting device in the bore of the core; releasing the at least one of the insulating portions and moving the at least one other connector away from the second predetermined location on the inserting device and into a slot of the core; and moving the at least one connector away from the first predetermined location on the inserting device and into another slot of the core.

6. The method of claim 5 wherein the inserting device includes a plurality of grooves and wherein the positioning of the at least one connector at a first predetermined location and the positioning of the at least one other connector at the second predetermined location includes moving the at least one connector and the at least one other connector into respective grooves of the inserting device.

7. A phase insulator inserting device for disposing at least one phase insulator on a dynamoelectric machine core having a longitudinally extending bore and longitudinally extending slots, and wherein the at least one phase insulator includes at least one insulating end portion and at least two connectors secured to the insulating end portion for placement within predetermined slots of the core, said inserting device comprising: means for deforming at least part of the at least one insulating end portion of the at least one phase insulator in a generally arcuate configuration; means for accommodating the at least two connectors of the at least one phase insulator at predetermined spaced apart locations on the device; and means for constraining the at least part of the insulating end portion to remain deformed; said means for constraining being movable within the bore of the core along with the at least part of the insulating end portion; said means for constraining being releasable thereby to allow movement of the at least two connectors into predetermined slots of the core.

8. The phase insulator inserting device of claim 7 wherein the means for accommodating the at least two connectors includes at least two spaced-apart grooves for accepting the at least two connectors therein.

9. The phase insulator inserting device of claim 7 wherein the means for constraining at least part of the insulating end portions includes at least one cap movable relative to the deforming means for constraining at least part of at least one insulating end portion adjacent to the deforming means.

10. The phase insulator inserting device of claim 7, further including means for preventing longitudinal displacement of the at least part of the at least one insulating end portion on the device.

11. The phase insulator inserting device of claim 10 wherein the means for preventing longitudinal displacement includes an abutment located along a peripheral surface of the device.

12. An apparatus for placing at least one phase insulator having a leading end, a trailing end, and comprising two oppositely disposed insulating portions interconnected by connectors on a dynamoelectric machine core having a bore and a plurality of axially extending slots disposed radially around and opening into the bore, said apparatus comprising: an arbor for insertion into the bore of the core while at least a part of at least one of the insulating portions of at least one phase insulator is retained in a deformed condition; said arbor including a leading end accommodating means for accepting at least one connector proximate to the leading end of the phase insulator; said arbor further including a trailing end accommodating means for accepting at least one connector proximate to the trailing end of the phase insulator; means for limiting radial movement of the insulating portions away from the arbor and thereby allowing relative movement of the arbor and core and disposition of the arbor in an insulator insertion position within the bore.

13. The apparatus of claim 12 wherein release of the means for limiting radial movement while the arbor is in the insulator insertion position causes the at least one other connector proximate to the trailing end to move into a slot of the core.

14. The apparatus of claim 12 further including means for positively moving the at least one connector proximate to the leading end out of the leading end accommodating means and thereby causing movement of the at least one connector into a slot of the core.

15. The apparatus of claim 14 wherein said means for positively moving the at least one connector proximate to the leading end includes a camming mechanism for pushing the at least one connector from the leading end accommodating means.

16. A method of fabricating a dynamoelectric machine stator assembly including a core having faces, having a longitudinally extending bore, and having a plurality of axially extending slots disposed radially around and opening into the bore; including a plurality of windings having side turns disposed within the slots and end turns disposed about the faces of the core; and also including at least one phase insulator comprising a leading end, comprising a trailing end, and comprising at least two oppositely disposed end portions interconnected by connectors; said method comprising: disposing at least one winding on the core so that side turns thereof reside within selected slots of the core and so that end turns thereof are disposed about the faces of the core; placing at least one connector proximate to the leading end at a first predetermined location on an inserting device; deforming the at least one phase insulator about the inserting device; placing at least one other connector proximate to the trailing end of the at least one phase insulator at a second predetermined location spaced apart from said first predetermined location; retaining at least part of the end portions of the at least one phase insulator about the inserting device; aligning and moving the inserting device and core relative to each other so as to dispose the inserting device within the bore of the core; releasing the at least part of the end portions of the at least one phase insulator and moving the at least one other connector into a predetermined slot of the core; aligning and moving the at least one connector into another predetermined slot of the core; and disposing at least one other winding on the core so that side turns thereof reside in predetermined slots of the core and so that end turns thereof are disposed about the core faces, and wherein the end portions of the at least one phase insulator are disposed between at least part of the end turns of the at least one winding and at least part of the end turns of the at least one another winding.

17. The method of claim 16 wherein grooves are provided at the first and second predetermined locations and wherein the method includes disposing the at least one connector and the at least one other connector within respective grooves.

18. A method of inserting phase insulators into a dynamoelectric machine core including a longitudinally extending bore and a plurality of longitudinally extending slots disposed radially about the bore and opening into the bore, each of said phase insulators including end turn insulators interconnected by at least one connector, said method comprising: deforming a plurality of phase insulators so as to constrain the insulators to lie within an imaginary cylinder having a diameter less than the diameter of the bore of the core; axially moving the plurality of insulators while confined within the imagainary cylinder into the bore of the core; aligning connectors of the phase insulators with predetermined slots of the core; moving the end turn insulators radially beyond the imaginary cylinder and moving the connectors of the phase insulators into the predetermined slots of the core.

19. The method of claim 18 wherein moving the connectors of the phase insulators into the predetermined slots includes engaging and pushing at least one connector of each phase insulator so as to positively move the at least one connector into its respective predetermined slot.

20. A method of inserting a phase insulator into a dynamoelectric machine stator core having a longitudinally extending bore and a plurality of longitudinally extending slots disposed radially around and opening into the bore, said phase insulator including two oppositely disposed end turn insulating portions interconnected by at least one connector, said method comprising: developing stored energy in the at least one phase insulator; moving the at least one phase insulator into an insertion position within the bore of the core; and releasing the stored energy of the at least one phase insulator for moving the at least one connector of the at least one phase insulator into a predetermined slot of the core.

21. The method of claim 20 wherein the at least one phase insulator includes a plurality of connectors and wherein the method further includes engaging and positively moving at least one connector of the plurality of connectors for aiding the released stored energy for moving the at least one connector into its respective predetermined slot of the stator core.

22. A method of inserting phase insulators for use in fabricating a dynamoelectric machine stator assembly including a core having faces, having a longitudinally extending bore and having a plurality of longitudinally extending slots disposed radially around and opening into the bore; the stator assembly also including a plurality of windings having side turns disposed within the slots and end turns disposed about the faces of the core, and further including a plurality of phase insulators with each phase insulator including oppositely disposed insulating portions disposed between at least part of end turns of at least two windings and with each phase insulator including at least one connector disposed within a predetermined slot for securing together the oppositely disposed insulating portions, said method comprising: positioning at least one connector of each of the plurality of phase insulators at predetermined locations on an inserting device, and deforming at least part of at least one of the insulating portions of the plurality of phase insulators so that each of the at least one of the insulators lie within an imaginary cylinder having a diameter less than the diameter of the bore; moving the inserting device and the core relative to each other for disposing the inserting device within the bore of the core; and moving the plurality of phase insulators away from the inserting device and outside of the imaginary cylinder whereby connectors of the plurality of phase insulators move into predetermined slots of the core.

23. The method of claim 22 wherein the inserting device includes a plurality of grooves and wherein positioning at least one connector of each of the plurality of phase insulators at predetermined locations includes moving the at least on connector of each phase insulator into one of the grooves of the inserting device.

24. An apparatus for inserting a plurality of phase insulators into a dynamoelectric machine core having a bore and a plurality of axially extending slots disposed radially around and opening into the bore, and wherein each phase insulator includes two oppositely disposed insulating portions interconnected by at least one connector, said apparatus comprising: means for accommodating the at least one connector of each of the plurality of phase insulators; means for deforming at least one of the insulating portions of the phase insulators whereby the at least one of the insulating portions lie within an imaginary cylinder having a diameter less than the diameter of the bore; means for limiting radial movement of the insulators so that the means for accommodating and the core may be relatively moved for disposing the means for accommodating in an insulator insertion position within the bore.

25. A method of fabricating a dynamoelectric machine stator assembly including a core having faces, having a longitudinally extending bore, and having a plurality of longitudinally extending slots opening into the bore; including a plurality of windings having side turns disposed within the slots, and having end turns disposed about the faces of the core; and including a plurality of phase insulators having oppositely disposed end turn insulators, each having leading and trailing ends disposed between end turns of at least two windings and having connectors disposed within some of the slots for securing together the oppositely disposed end turn insulators; said method comprising: disposing a plurality of phase insulators on an inserting device having a generally cylindrical configuration by positioning the lead ends of phase insulators adjacent the device and wrapping the trailing end portions of the phase insulators about the device so that all of the insulators are disposed in an endless overlapping pinwheel configuration about the device, and all of the connectors are accomodated on the device; retaining the end turn insulators on the inserting device in an endless mutually overlapping pinwheel configuration; aligning and moving the core and inserting device relative to each other so that the inserting device is within the bore of the core; releasing the end turn insulators and moving the connectors of the phase insulators into slots of the core, and positioning the phase insulators in an endless overlapping pinwheel configuration about the face of the core; and moving the core and inserting device relative to each other so as to remove the inserting device from the bore of the core.

* * * * *